(12) United States Patent
Krause (10) Patent No.: US 7,681,123 B2
(45) Date of Patent: *Mar. 16, 2010

(54) USER INTERFACE FOR DYNAMIC PRESENTATION OF TEXT

(75) Inventor: Philip R Krause, Bethesda, MD (US)

(73) Assignee: Resource Consortium Limited (VG)

(*) Notice: Subject to any disclaimer, the term of this patent is extended or adjusted under 35 U.S.C. 154(b) by 1020 days.

This patent is subject to a terminal disclaimer.

(21) Appl. No.: 10/908,869

(22) Filed: May 31, 2005

(65) Prior Publication Data

US 2005/0246619 A1 Nov. 3, 2005

Related U.S. Application Data

(63) Continuation of application No. 09/628,729, filed on Jul. 28, 2000, now Pat. No. 6,931,587, which is a continuation-in-part of application No. 09/015,660, filed on Jan. 29, 1998, now Pat. No. 6,154,757.

(51) Int. Cl.
*G06F 17/00* (2006.01)

(52) U.S. Cl. .................................. 715/256; 715/255

(58) Field of Classification Search .................. 715/531, 715/500, 530, 200, 255–256, 784–785
See application file for complete search history.

(56) References Cited

U.S. PATENT DOCUMENTS

| 6,067,069 | A  | * | 5/2000  | Krause ....................... 345/685 |
| 6,324,511 | B1 | * | 11/2001 | Kiraly et al. ................ 704/260 |
| 6,568,939 | B1 | * | 5/2003  | Edgar ......................... 434/179 |
| 6,726,487 | B1 | * | 4/2004  | Dalstrom .................... 434/178 |
| 6,931,587 | B1 | * | 8/2005  | Krause ....................... 715/205 |
| 6,952,220 | B1 | * | 10/2005 | Rossmann .................. 345/684 |
| 2002/0130891 | A1 | * | 9/2002 | Singer ........................ 345/684 |
| 2002/0180799 | A1 | * | 12/2002 | Peck et al. .................. 345/784 |

* cited by examiner

*Primary Examiner*—Thu Huynh
(74) *Attorney, Agent, or Firm*—Carlineo, Spicer & Kee, LLC (57) ABSTRACT

An apparatus, method and article of manufacture of the present invention provide improved rate of text presentation to a reader. The invention provides a method for defining a region of the display at which text is preferably read, and further provides a user interface for adjusting the speed of text display according to a screen location corresponding to that at which text is being read at any time.

20 Claims, 4 Drawing Sheets

Flow diagram of the invention.

FIGURE 1. Computer system

Figure 2. Flow diagram of the invention.

Figure 3

| Now is | the time for all good men to come to the aid | of their country |
|---|---|---|
| 440 | 410　　　　　　　　　420 | 430 |

Figure 4

USER INTERFACE FOR DYNAMIC PRESENTATION OF TEXT

RELATED APPLICATIONS

This application is a continuation of application Ser. No. 09/628,729, filed Jul. 28, 2000, which is a continuation in part of application Ser. No. 09/015,660 filed Jan. 29, 1998, to which priority under 35 U.S.C. § 120 is claimed. This application contains material from Ser. No. 08/818,152, which was filed Mar. 14, 1997, incorporated by reference in Ser. No. 09/015,660, and issued as U.S. Pat. No. 6,154,757. The specification of Ser. No. 09/015,660 is incorporated herein by reference. Subsequent to filing of this application, on Aug. 16, 2005, U.S. Pat. No. 6,931,587 was issued for application Ser. No. 09/628,729.

BACKGROUND OF THE INVENTION

This invention relates generally to the fields of information processing and display by computers, and human-machine interfaces for computers. The present invention further relates to providing the user with an interface to control the speed at which text is imaged on a computer display. The present invention further provides this interface in a manner which permits optimization of reading speed while minimizing the need to make changes in the fixation of the user's eyes.

DESCRIPTION OF THE RELEVANT ART

In the current art, computer programs which display text to a reader do not permit optimization of the user's reading speed. When the reader reaches the bottom of a page of displayed text, some manual operation is necessary to advance the display to the next page of text, resulting in a need to retrain the eye on a new location and a consequent loss of reading speed. Alternatively, in teleprompter type systems, text is simply presented at a constant rate, independently of the desire of the speaker to change rates as she speaks. Currently available text display systems, including printed books, also require frequent changes in the location of eye fixation in order to permit rapid reading of a text.

One alternative is for the text to scroll from the bottom of a text window, but in practice, the need to manually advance the text using a scroll bar interferes with the reader's comprehension and enjoyment of the text. Only rarely can the user optimize the speed of text display to correspond with a desired reading speed. The need to simultaneously pay attention to a scroll bar and to the text further distracts the reader and requires frequent changes in the location of eye fixation.

While it would be possible to set the text to scroll from the end of a text window at a fixed rate of speed, thereby obviating the need to pay attention to a scroll bar, this strategy would have the disadvantages that the selected speed might not correspond precisely to the reader's wishes, and that the reader's desired speed of text reading might change as eye fatigue sets in or as the material being read varies in complexity or in level of interest to the reader. Thus, providing the reader with a method to signal the computer regarding desired changes in rate of text display in a way which minimizes changes in ocular fixation and requires minimal manual input would be a significant advance over the current art. This represents an entirely new style of reading, in which text is dynamically provided to the reader by a computer system at a precisely optimized rate, rather than requiring the reader to repeatedly change locations of eye fixations as she or he reads through a statically displayed text.

Thus, the current art imposes the following disadvantages on a reader of a text who desires to maximize his or her reading speed while minimizing distractions and fatigue associated with extra eye movements.

First, no method exists in the current art to provide for variable speed presentation of text, in accordance with the reader's own interpretation of the level of difficulty of the text or level of interest in the text, as the text is being presented.

Second, no method exists in the current art to provide for variable speed presentation of text, without requiring manual signalling of the computer between pages or as the text is scrolled.

Third, no method exists in the current art to dynamically optimize the rate of text presentation to correspond precisely with a reader's actual reading speed.

The present invention derives from the observation that if text were continuously scrolled from the end of a page, if the rate of text presentation were too slow, there would be a reader to find himself reading ahead of the optimal reading location. On the other hand, if the rate of text presentation were too fast, the reader would find himself reading behind the optimal reading location. According to the method, changes in the position of a cursor which is associated with a cursor control device are used as a cue for changing the rate of text presentation. In a preferred embodiment, this cursor control device is associated with the position at which text is being read, such that leaving the cursor in a predefined neutral zone does not change the rate of text display, but moving the cursor to a position associated with text coming after that displayed in the predefined neutral zone (to an "acceleration zone") increases the rate of text display, and moving the cursor to a position associated with text coming before that displayed in the predefined neutral zone (to a "deceleration zone") decreases the rate of text display. Moving the cursor to another predefined location (in a preferred embodiment, to the left or right edge of the screen) stops text advance. In another preferred embodiment, the cursor movement may be determined by computer-assisted recognition of the location at which text is being read aloud.

This invention is in part enabled by the current art, which provides methods to signal a computer system regarding location of ocular fixation or detection of head movements, for example, U.S. Pat. Nos. 5,583,335, 5,526,022, 5,517,021, 5,422,689, 5,367,315, 5,360,971. Other methods of detecting direction of eye fixation or of head movement may also be used. Examples include sensors which consist of a ball within a hollow sphere surrounded by detectors, such that changes in head movement are detected as changes in the location of the ball within the sphere, and methods based on video input from a display-mounted camera, which interpret eye fixation and permit definition of an area on the screen which is being looked at. Alternatively, devices which identify changes in head movement or in the location being looked at on the display could be used. In addition, various other devices, including "virtual reality machines" (including goggles), in which a computer display is integrated into a device which collects information on eye or head movements and provides them to a computer, could also be adapted to this purpose. Computer-assisted methods can also be used to determine the location at which text is being read aloud; for example, the invention may use voice recognition software to control a cursor location by causing the cursor to be located at the location in the text at which the reader is reading aloud. These hardware and software devices provide mechanisms to enhance the utility of the present invention, an improved user interface which could be used with these and other cursor control devices.

This invention is further enabled by the current art of computer programming, which permits a computer programmer of ordinary skill to perform the programming steps necessary to implement this invention with reference to this description and the accompanying drawings.

OBJECTS AND SUMMARY OF THE INVENTION

The present invention provides an improved user interface for reading a text that provides enhanced functionality and flexibility over conventional methods of reading text.

One object of the present invention is to provide an improved teleprompter device that provides text to the reader at a rate that corresponds to the rate at which the reader is reading the text.

Another object of the present invention is to use information about where text is being read aloud to signal the computer system to increase or decrease the rate of text display in accordance with this cue.

Another object of the present invention is to take advantage of natural eye or head movements to signal the computer system to increase or decrease the rate of text display in accordance with these cues.

Another object of the present invention is to permit a reader to designate at least one preferred region on the screen (called the "neutral zone") such that the rate of text presentation remains approximately constant when the reader is reading text presented in this region.

Another object of the present invention is to provide a variable rate of text presentation that approximates the rate at which the reader is actually reading the text.

Another object of the present invention is to permit a reader to signal the computer to scroll backwards through a text, if necessary, to find a desired passage or to reread information of special interest.

Another object of the present invention is to permit a reader to designate screen regions such that when the computer is signaled that text is being read from these regions, the rate of text presentation is accelerated or decelerated. Among other embodiments, this may be a accomplished by providing a mathematical function of the distance from the neutral zone, such that head or eye movement to positions outside the neutral zone causes the rate of text presentation to decelerate or accelerate according to this function of the distance.

Another object of the present invention is to permit a reader to optimize his or her reading speed through a text, according precisely to his or her preferences.

Another object of the present invention is to improve a reader's comprehension of a text, by minimizing external distractions as the text is being read.

The present invention, as broadly described herein, provides a user interface and method for using a computer system to permit a reader to optimize the rate at which text is presented on a computer display controlled by the computer, comprising the steps of determining the location on the computer display at which text is being read by the reader, and varying the rate at which text is presented in response to the result of the location-determining step. In a preferred embodiment, the invention comprises the steps of 1) defining a cursor location as a location on the display corresponding to that at which text is being read, 2) defining a neutral zone as at least one region of the display at which reading or other consumption of information presented by the computer system preferably takes place, 3) defining at least one region of the display as a deceleration zone, associated with the presentation of text which comes before the text displayed in the neutral zone at any given time, such that when the defined cursor signifies a location within a deceleration zone, the rate of text presentation decreases according to a mathematical function of the distance between the cursor location and the neutral zone, and 4) defining at least one region of the display as an acceleration zone, associated with the presentation of text which comes after the text displayed in the neutral zone at any given time, such that when the defined cursor signifies a location within an acceleration zone, the rate of text presentation increases according to a mathematical function of the distance between the cursor location and the neutral zone. The neutral zone is normally further defined such that the rate of text presentation does not appreciably change when text within the neutral zone is being read. A method to instantly stop continued presentation of text is also provided. One such method is the definition of stop zones on the display, such that the user may easily cause continuous presentation of text to stop by moving the cursor to a location corresponding to a stop zone.

The mathematical functions which define the effect of reading text at different positions outside the neutral zone may be continuous or discrete functions of distance from the neutral zone, and are normally non-decreasing functions of distance from the neutral zone, such that the farther away from the neutral zone the reader is, the more dramatic the effect on the rate of text presentation may be. In addition, in a simple embodiment, the function may be a constant, such that all cursor locations in a given type of zone yield the same effect on rate of text presentation.

The various zones, such as the neutral zone, stop zones, acceleration zones and deceleration zones may be defined graphically, using a cursor-control device to specify their limits and shapes. These zones may be differentiated from one another on the display by altering the attributes of text displayed in each zone, or by providing different backgrounds within each zone. In this manner, the user can adjust the non-rate parameters associated with text presentation to match his reading style or needs.

The cursor position which corresponds to the position at which text is being read may be determined by any cursor control device, including one which responds to eye, head or hand movements, or to audio input.

In a specific preferred embodiment, the invention comprises using a computer system to determine the location on the computer display at which text is being read aloud by the reader, and to vary the rate at which text is presented in response to the result of the location-determining step.

Also, according to the present invention, a computer system comprising means for effectuating the method of the present invention is provided. Further according to the present invention, computer-readable memory encoded with a program directing the computer system to effectuate the method of the present invention is also provided.

Additional objects and advantages of the invention are set forth in part in the description that follows, and in part are obvious from the description, or may be learned by practice of the invention. The objects and advantages of the invention may also be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate particular embodiments of the invention, and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings. The steps required to practice this invention are readily accomplished by a person of ordinary skill in the art of computer programming, with reference to this description and the accompanying drawings.

Figure 1:
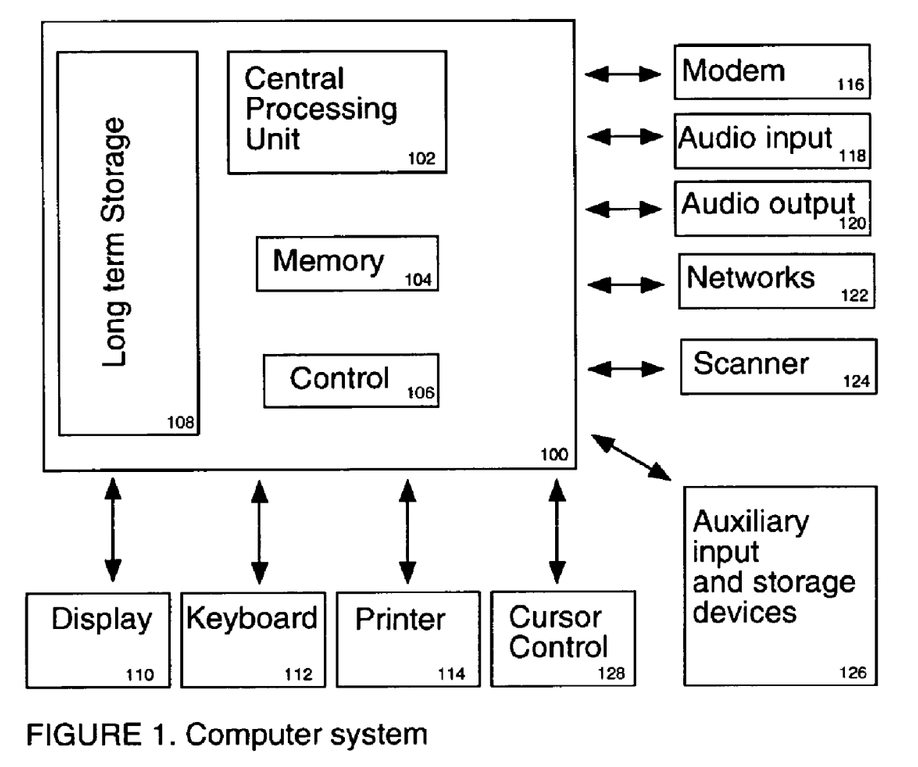
FIG. 1 presents a block diagram of a computer system as may be utilized by the present invention.

The invention is described in the context of a computer system (100), as pictured in FIG. 1, which consists of a Central Processing Unit (102), memory and/or storage (which may include random access short term memory [104] or long-term storage such as a hard disk or other disk drives [108]), a Control function (106), and, a display device such as a monitor (110), and one or more cursor control devices (128). In addition, such systems may contain additional means for input such as a keyboard (112), auxiliary input and storage devices (126), including scanners (124), audio input such as a microphone (118), audio output such as amplified loudspeakers (120), and access to other computer systems via modem (116) or networks (122). The preferred embodiment is described in the context of a computer system which is capable of running programs in a Windows™ environment.

Figure 2:
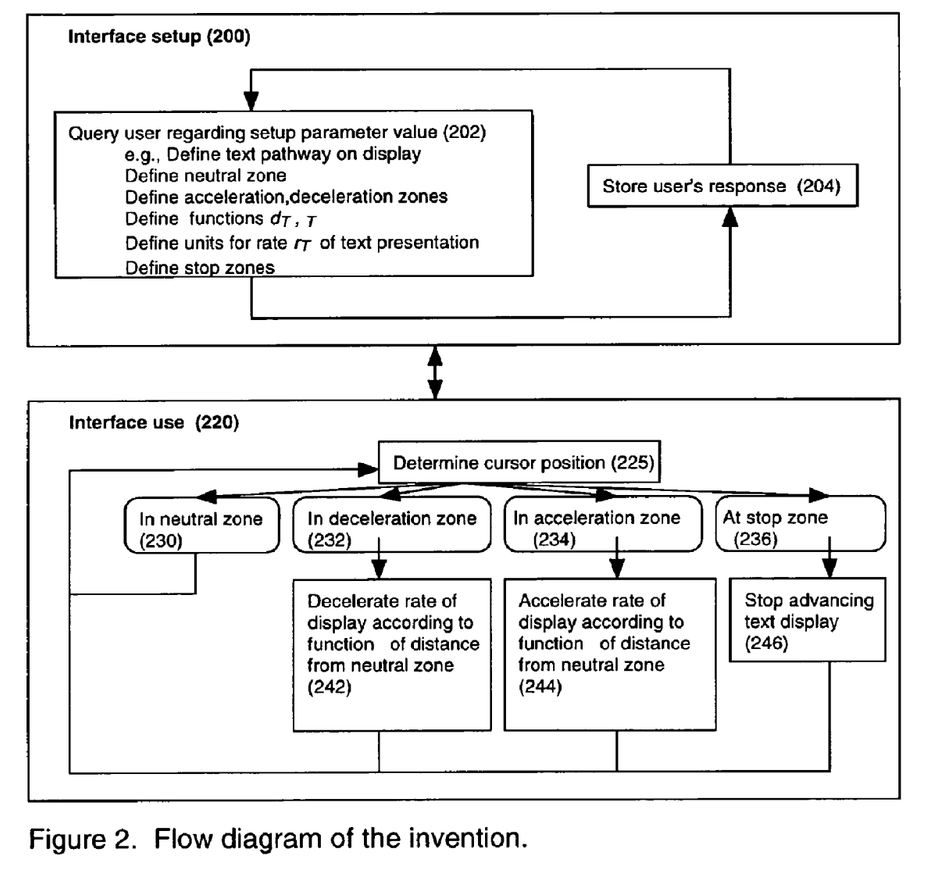
FIG. 2 presents a flowchart, diagramming the two major steps of the invention, interface setup and the actual interface.

FIG. 2 presents a flow diagram of the invention. While the invention can be practiced in a manner different from that depicted in the flow diagram, the flow diagram provides a useful overview for understanding the invention. The invention involves, among other things, the use of a computer system, such as that depicted in FIG. 1, to display electronic text stored in the computer system or stored external to the computer system. As shown in FIG. 2, the invention comprises two steps, that of user interface setup (200) and the actual use of the interface (220). In some embodiments, the setup function might be performed in advance by the author of a computer program, or some other individual besides the end-user, leaving the user to use the interface as described. In other embodiments, the user has the flexibility to modify one or more parameters associated with the interface. In a preferred embodiment, the user may modify these parameters at any time while using the invention.

In a preferred embodiment, the setup procedure comprises the steps of querying the user via a dialog box regarding desired values for parameters which affect the user interface (202) and of storing the responses (204). Examples of parameters affecting the interface include the pathway that text takes as it advances across the display, including designation of the location on the display of the neutral zone (which is the preferred reading area), deceleration zones (for the display of text which comes before that displayed in the neutral zone) and acceleration zones (for the display of text which comes after that displayed in the neutral zone). The neutral zone is broadly defined as the preferred reading area, which may encompass one or more discrete portions of the display, which together comprise a neutral zone. Input may also be accepted regarding a mathematical function $\partial_T$ (defined below) used to determine the amount by which the rate of text display accelerates or decelerates depending on the cursor location or a function $d_T$ (also defined below) describing distance between items displayed at different screen locations. In a preferred embodiment, the neutral zone is defined graphically, using a cursor control device to outline the limits of the neutral zone. Other zones, corresponding to acceleration and deceleration zones, may also be defined graphically. The units of the rate function $r_T$ (defined below) may be defined in different units of speed (e.g., words per unit time, lines per unit time, characters per unit time). In some embodiments, the invention may itself provide preprogrammed functions, from which the user may select via a menu or some other method well known in the current art. In a preferred embodiment, cursor locations which signal the invention to stop text advance are also defined as stop zones; most users would define this as a region on either side of the display screen. This permits the user to stop continuous updating of text when interrupted, simply by turning her head. A stop zone might also preferably be defined at the upper margin of a deceleration zone, to permit the user to readily stop continued presentation of additional text when text of interest is about to leave the display.

After collecting information regarding the configuration of the interface, in a preferred embodiment the computer system stores this information (204) in a manner which permits its retrieval as the interface functions, and also permits the user access to the same parameter set on other occasions, obviating the need to completely redefine the parameters on each use of the invention.

The normal use of the interface (220) comprises the steps of the computer system determining the cursor location (225), and changing the speed of text scrolling (240-246) depending on that location (230-236). A text is defined as any material which is meant to be presented in a certain linear order, for example, characters, numbers, figures or other graphics. Scrolling on a region of a display is defined as the movement of text along a predefined pathway on the display, such that all lines shift in position along this pathway as new text is added, at the same rate at which new text is added, and such that when the limits of the regions defined for display of text are reached, text disappears if it would otherwise migrate beyond those limits. Thus, according to this definition, text may be scrolled in clusters of one or more units (e.g., lines, characters, figures) at a time. In particular, scrolling means that text proceeds in some manner from one or more acceleration zones, through the neutral zone (where it is preferably read) and through one or more deceleration zones prior to departure from the screen. In some preferred embodiments, it is possible to hold some text items (e.g., figures, tables) on the screen for longer periods of time, or indefinitely, either within the normal pathway for text, or in a supplementary location.

The following definitions of functions and terminology describe a preferred embodiment of the invention:

A text may be represented mathematically as a function $t(x)$ over some range of integers x, where x signifies a position within the text, and $t(x-1)$ comes before $t(x)$ and $t(x+1)$ comes after $t(x)$ for all defined values of t. As noted above, different elements of a text t are not required to be of identical types, for example, various elements may be words, lines, characters, sounds, images, pictures, figures or other data that can be represented digitally. The only requirement regarding t is that it be of a sequential nature.

The descriptor $s_T(t(x))$ refers to the screen location of a text item $t(x)$ at a position x within a text t at some arbitrary time T. In a preferred embodiment, $s_T(t(x))$ is dependent on the pathway that text takes as it scrolls on the display, the rate of text display as calculated using the other described functions, and the previous cursor movements.

Values of the function $d_T(x_1,x_2)$ describing the distance between two items at positions $x_1$ and $x_2$ within a text t at times T may be dynamically calculated from the values of $x_1$, $x_2$, and of the screen locations $s_T(t(x_1))$ and $s_T(t(x_2))$. In some embodiments, $d_T(x_1,x_2)$ may be a function of a subset of these values. For all text items $t(x_1)$ and $t(x_2)$ both displayed in the neutral zone at time T, $d_T(x_1,x_2)$ is defined as zero. All functions $d_T(x_1,x_2)$ fulfill the mathematical criteria for distance functions, such that for all $x_1$, $x_2$, and $x_3$ on which $d_T$ is defined, $d_T(x_1,x_2) \geq 0$, $d_T(x_1,x_2)=d_T(x_2,x_1)$ and $d_T(x_1,x_2)+d_T(x_2,x_3) \geq d_T(x_1,x_3)$. It may be seen that the distance between two text items may change with time, since $d_T$ may be dependent on $s_T$, which in turn changes with time. Also, this distance function does not necessarily define distance in precisely the same way for items in acceleration and deceleration zones. In one simple example of a distance function defined on a standard Windows™ text box, such that text scrolls from the bottom one line at a time, one may define the distance between two text items as the number of lines that separate them. In this example, if the neutral zone consisted of more than one line, this function would measure distance between a text item and the neutral zone as the number of lines from the nearest border of the neutral zone, unless the text item were in the neutral zone, in which case the distance would be zero.

The rate change sign $\sigma(x_1,x_2)$ is defined such that $\sigma(x_1,x_2)=1$ when $x_1 \geq x_2$ and $\sigma(x_1,x_2)=-1$ when $x_1 < x_2$, where $x_1$ and $x_2$ are integers representing positions in a specified text. Thus, $\sigma(x_c,x_n)$ is positive when a text item at position $x_c$ in the text t (normally defining the text item that is closest to the cursor location) comes after a text item at position $x_n$ (normally defined in the neutral zone), indicating a need to speed up the rate of text presentation. On the other hand, $\sigma(x_c,x_n)$ is negative when a text item at position $x_c$ in a text t (normally defining the text item that is closest to the cursor location) comes before a text item at position $x_n$ (normally defined as in the neutral zone), indicating a need to slow down the rate of text presentation.

The rate of text presentation $r_T$ is defined such that higher rates correspond to faster text presentation. If the cursor is in a stop zone, $r_T$ is defined as zero. Otherwise, if the cursor remains outside of the neutral zone, the rate of text presentation $r_T$ at time T may change as defined by a function $\partial_T(x_c,x_n)$ of $\sigma(x_c,x_n)$ and of the distance $d_T(x_c,x_n)$ between text $t(x_c)$ displayed at the location $s_T(t(x_c))$ closest to that specified by the cursor and text $t(x_n)$ displayed in the neutral zone at location $s_T(t(x_n))$, such that $dr_T/dT=\sigma(x_c,x_n) \cdot \partial_T(x_c,x_n)$, where · denotes multiplication and where $dr_T/dT$ represents the first derivative of the rate function $r_T$ with respect to time.

The family of functions $\partial_T(x_1,x_2)$ fulfills the criteria that for all $x_1$ and $x_2$, $\partial_T(x_1,x_2) \geq 0$, and $\partial_T(x_1,x_2)=0$ when $d_T(x_1,x_2)=0$. In a preferred embodiment, the function $\partial_T(x_1,x_2)$ may be a continuous or discrete function of $d_T(x_1,x_2)$ and $\sigma(x_1,x_2)$ for all $x_1$, $x_2$, and T, but normally is further constrained such that for all $x_n$, $x_1$, $x_2$, and T, where $s_T(t(x_n))$ is in the neutral zone, if $d_T(x_n,x_1) \geq d_T(x_n,x_2)$, then $\partial_T(x_n,x_1) \geq \partial_T(x_n,x_2)$. This constraint permits definition of $\partial_T$ such that the farther the reader's current position is from the neutral zone, the more dramatic the effect on the rate of text presentation will be. In addition, this constraint enables another embodiment that has the merit of simplicity in which $\partial_T$ is constant when $d_T$ is greater than 0, thereby applying a constant rate of acceleration or deceleration until neutral zone reading is resumed.

In many embodiments, for all $x_1$, $x_2$, and T, $\partial_T(x_1,x_2)=\partial_T(x_2,x_1)$, promoting symmetry of effect on rate when the cursor position is in the same relative position within acceleration or deceleration zones. However, it is also possible to define the function $\partial_T(x_1,x_2)$ such that this equality does not hold true, permitting asymmetry of the extent of rate changes associated with cursor locations in corresponding locations of acceleration and deceleration zones. In a preferred embodiment, the reader has the ability to define or select the mathematical functions that govern the rate of text presentation. For example, in some cases the reader may prefer to set a maximum rate of text presentation, such that incidental presence of the cursor in an acceleration zone does not result in a rate of text presentation in excess of the reader's preferred reading speed, which could cause discomfort and would likely only result in a downward adjustment in speed as the reader falls behind and the cursor moves to a deceleration zone.

In a preferred embodiment, should the cursor continuously signify text which precedes that presented in the neutral zone, so that at some time T the function $r_T$ becomes less than zero, the text begins to scroll backwards (along the pathway defined on the display) rather than forwards, such that a negative rate of text presentation corresponds to reverse scrolling. Should the cursor be located in a stop zone, $r_T$ becomes zero, and the scrolling of the text ceases.

In some preferred embodiments, a time lag between initiation of a rate change and the presence of the cursor in an acceleration or deceleration zone is introduced. This feature prevents unwanted rate changes from occurring as a result of unintended and/or momentary movement of the cursor out of the neutral zone.

Figure 3:
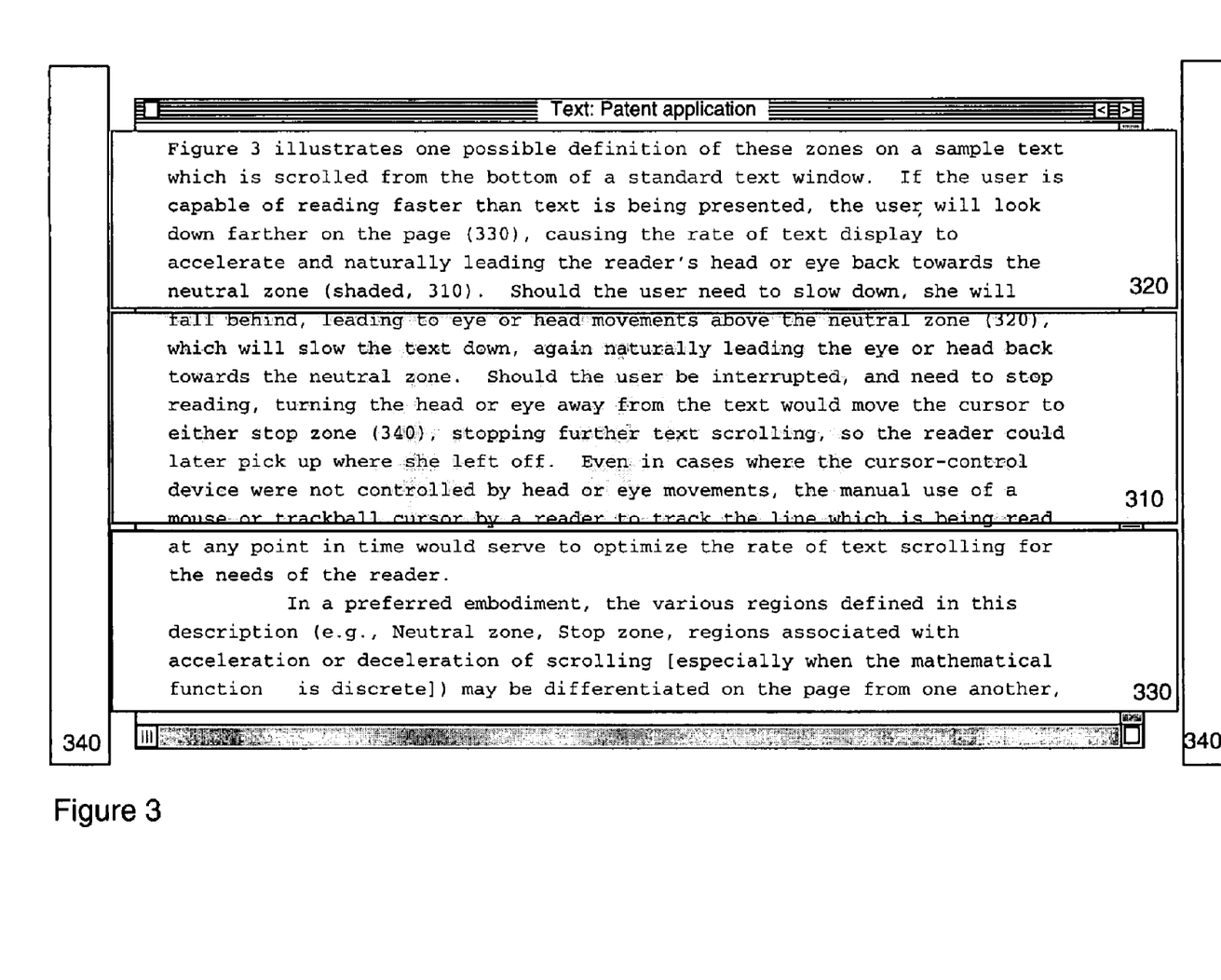
FIG. 3 illustrates a sample text display block, such as that which could be presented by text presentation or word processing programs. Regions on this block are shown to illustrate the function of the invention as described below in the detailed description of the preferred embodiments.

The interface of the present invention is of significant value when the cursor control device signals the computer system regarding changes in head or eye position. Using natural head or eye movements, the user can control the rate of text presentation in a manner which corresponds to the desired reading speed. FIG. 3 illustrates one possible definition of these zones on a sample text which is scrolled from the bottom of a standard text window. If the user is capable of reading faster than text is being presented, the user will look down farther on the page (330), causing the rate of text display to accelerate and naturally leading the reader's head or eye back towards the neutral zone (shaded, 310). Should the user need to slow down, she will fall behind, leading to eye or head movements above the neutral zone (320), which will slow the text down, again naturally leading the eye or head back towards the neutral zone. Should the user be interrupted, and need to stop reading, turning the head or eye away from the text would move the cursor to either stop zone (340), stopping further text scrolling, so the reader could later pick up where she left off. Even in cases where the cursor-control device is not controlled by head or eye movements, the manual use of a mouse, trackball, or other cursor control device by a reader to track the line which is being read at any point in time would serve to optimize the rate of text scrolling for the needs of the reader.

In a preferred embodiment, the various regions defined in this description (e.g., neutral zone, stop zone, acceleration or deceleration zones [especially when the mathematical function $\partial_T$ is discrete]) may be differentiated on the page from one another, either by changing attributes of the text shown within the regions (e.g., by bolding, changes in font, color, or style), or by changing attributes of the display background (e.g., shading, coloring) within the regions.

Figure 4:
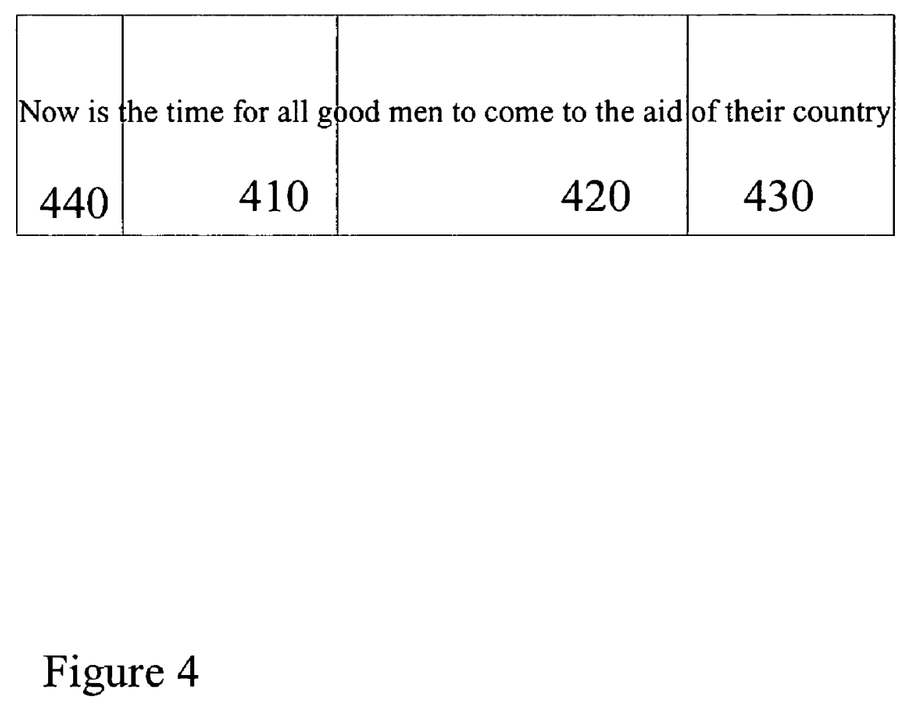
FIG. 4 illustrates a teleprompter embodiment of the invention, in which the described method can be used to optimize the speed at which text is read aloud.

In another preferred embodiment, the method of this invention is used to control an automatic teleprompter device (FIG. 4). In this case, text generally scrolls from the right hand side of the text window. The neutral zone (420) is defined as the region where text is usually preferably read. The acceleration (430) and deceleration (410) zones work as described above. However, if the user has ceased reading text, the entrance of text into a deceleration zone (410) does not cause text scrolling to slow down (and behaves as a neutral zone). Moreover, in this embodiment, when initiating reading or when re-initiating reading after a stop zone (440) was entered (by the last word that was read), the deceleration zone (410) is redefined as a neutral zone. This enables the reader to pick up where she left off after stopping reading, and to naturally begin reading at the beginning of the text. If text scrolling is stopped by entering a stop zone (440), when reading is re-initiated, in some embodiments, scrolling resumes at the scrolling speed used directly prior to entering the stop zone. In another preferred embodiment, a predefined speed is used when reading is started, either after entering a stop zone or at the beginning of the text. In the context of this embodiment, text may be supplied to the user at a rate determined by the speed of reading aloud, information derived from the spoken words of the user being used to determine the cursor position of this invention. In a preferred embodiment of a teleprompter device, the cursor position may be determined by voice recognition software or other computer-assisted devices that is used to identify the location within a text that is being read aloud. Thus, A human user may also control a different type of cursor control device to specify the location at which text is being read aloud.

An alternative embodiment is best explained by example. Voice-recognition software may be used to regulate the speed of text presentation such that the syllable that is being read aloud is always maintained in a preferred location. When text is not being read, scrolling stops. This method leads to frequent starting and stopping of text movement, and may be perceived by a reader as jumping of the text. An alternative is to smooth the motion of the text in accordance with the reader's reading speed at any given moment (or his average reading speed over some period of time) to eliminate this jumping. For example, if the reader starts reading slower, he falls behind in the text. The computer system may notice this fact, and slow the rate of text presentation to a rate even slower than the current reading speed (based on how far behind the reader has fallen), in order to bring the reader back into a preferred reading zone. In doing this, the reader will have entered a deceleration zone as defined by this invention. Likewise, if the reader starts reading faster, he naturally enters an acceleration zone as defined by this invention. Entering these zones causes changes in the rate of text presentation as described. Even if acceleration and deceleration zones are not explicitly defined in the context of this embodiment, the calculations performed by the program when the location of reading leaves the preferred reading area are identical to those described in this specification in correspondence with these zones.

This teleprompter device may employ one or more display devices (including projectors) for purposes of delineating the various zones of this invention or for determining the cursor position indicating where text is being read. In addition, reading material related to this invention may be supplied over a network (such as the internet or a local area network), and information related to the location at which text is being read may also be transmitted over a network. This improved teleprompter device provides enhancements in the context of newscasts and speeches, where teleprompters are traditionally used, providing the advantage of permitting the speaker to talk at a more natural pace. This more natural pace also enables this device to be used by other speakers, such as talk radio hosts, dramatic actors or readers of books on tape.

In an alternative preferred embodiment, the various zones of this invention may be defined dynamically, such that at different times in the use of the invention, different regions of a display may represent different zones. Thus, as a user reaches the end of a text, the locations of acceleration, deceleration, and neutral zones may change, such that all text does not leave the display. Likewise, at the beginning of presenting a text, a deceleration zone might not be defined, in order to prevent accidentally backing up to a point at which no text is presented. In this alternative preferred embodiment, acceleration zones can also be defined depending on which of several potential neutral zones the user is reading from. In a simple example of this embodiment, two windows are displayed. When a user is reading from the first window, a region at the bottom of that window is defined as an acceleration zone. Once the user reaches that acceleration zone, it causes the next page of text to be displayed in the second window, and redefines that acceleration zone as a neutral zone, permitting continued reading in the region previously defined as an acceleration zone. Likewise, when the user reaches an acceleration zone defined at the bottom of the second window, the succeeding page is caused to be displayed in the first window and that acceleration zone is redefined as a neutral zone. Corresponding deceleration zones are defined at the top of each window, but are only active after the user has first read past them to the next window. In some of these embodiments, one or more of the defined zones may be absent.

In another preferred embodiment, the invention is provided as a part of a computer program whose purpose includes the display of text. In this situation, an appropriate means (e.g., use of keystrokes, point and click device action) to signal the program to begin and end the execution of the functions of this invention is also provided.

The primary input device for this invention is a cursor control device, broadly defined as any device capable of providing input to a computer with respect to external movements or designations of changes in screen positions. This input need not provide specific information on screen location, but could also be used to identify relative movements (e.g., based on directions) to obtain substantially the same result. Furthermore, it will be recognized by those skilled in the art that precise screen locations might not be computed for all cursor control devices. Computer system acceptance of cursor control device input in a manner such that cursor-control device movements could be mathematically mapped to screen locations with results as defined in this description also falls within the scope and claims of this invention. The cursor position as defined in this description may be the same as the cursor which is controlled by any cursor control device associated with the computer system. A computer system may thus have multiple cursor control devices and cursors associated with it. In addition, although the cursor position is calculated in the course of practicing the described preferred embodiment of this invention, in some embodiments a cursor might not be displayed. Thus, in this description, the cursor position may be defined as a region of the display which corresponds to the information collected by a device which may be used to signal cursor position, but does not necessarily require the display of a cursor, or the ability of the computer to use this cursor in any context other than that described here.

In a further preferred embodiment, the computer may be signalled to change the described cursor location by pressing appropriate keys on a keyboard communicating with the computer system. For example, arrow keys may be defined in the context of the described cursor, and movement of the cursor could be initiated by depressing the appropriate arrow keys. In addition, in a preferred embodiment, a keyboard could be used to implement various operations such as stopping, reverse-scrolling, or searching a text. Similarly, other methods of providing input to a computer system regarding movement in different directions or the location at which text is being read aloud, whether or not they cause a cursor to move on the screen, may be used in the practice of this invention, not limited to the types of devices which identify eye or head movement or recognize voice as described above.

It will be apparent to those skilled in the art that the invention described herein is not limited to the specific preferred embodiments discussed above. For example, although the above discussion describes a program using a cursor control device which detects head or eye movements or recognizes speech on a Windows™ platform, those skilled in the art will recognize that the invention could also be practiced with input devices such as trackballs, joysticks, light pens, mouses, touch-sensitive display panels and the like, and could also be usefully implemented on platforms such as Macintosh, X-Windows, NextStep, OS/2, Motif, Unix, Linux, Gnutella and the like. In addition, it will also be apparent to those skilled in the art that embodiments of this user interface which provide results equivalent to those obtained using the functions t, $d_T$, $\sigma$, $\partial_T$, and $r_T$ as described above also fall within the scope of this invention and claims, even if specific values for each of these functions are not explicitly calculated. This invention also may be practiced on stand-alone machines constructed for this purpose, or on variants of computer systems, such as personal digital assistants and the like. Moreover, those skilled in the art will recognize that this invention or parts of this invention could be practiced using computer hardware, bypassing the use of software for the purpose of providing the functionality of this invention. Furthermore, those skilled in the art will recognize that this invention may be practiced as a part of any computer program which displays text, as defined broadly herein, including but not limited to word processors, text readers (including those which audibly read text) and other text display programs. It will also be apparent to those skilled in the art that various modifications can be made to this invention of a computer-implemented method for providing a user interface which optimizes the rate of text display without departing from the scope or spirit of the invention and claims, including use of different parameters in the setup process. It is also intended that the present invention cover modifications and variations of the described user interface within the scope of the appended claims and their equivalents.

What is claimed is:

1. A method for using a computer system to permit a reader of a text that is presented on a computer display controlled by the computer system to optimize the rate at which text is presented, comprising the steps of:
   a) presenting text to be read on a computer display comprising a first region and a second region, wherein:
      i) said first and second regions are non-overlapping; and
      ii) said second region is associated with display of text that is intended to be read after the text displayed in said first region;
   b) determining the location on the computer display at which text is being read by the reader; and
   c) adjusting the rate of text presentation such that:
      i) when said location on the computer display at which text is being read by the reader is within said first region of the display, the rate of text presentation does not change substantially over time;
      ii) when said location on the computer display at which text is being read by the reader is within said second region of the display, the rate of text presentation increases; and
      iii) after text has been read at said second location on the computer display and said rate of text presentation has increased, when the location on the computer display at which text is being read by the reader is returned to said first region of the display, the rate of text presentation does not change substantially from said increased rate.

2. The method of claim 1, wherein said increase in rate of text presentation is a function of the distance between the location at which text is being read and said first region of the display.

3. The method of claim 1, wherein:
   a) said computer display also comprises a third region, wherein:
      i) said third region does not overlap said first and second regions
      ii) said third region is associated with display of text that is intended to be read before the text displayed in said first region; and
   b) the rate of text presentation is adjusted such that when said location on the computer display at which text is being read by the reader is within said third region of the display, the rate of text presentation decreases.

4. The method of claim 3, wherein said decrease in rate of text presentation is a function of the distance between the location at which text is being read and said first region of the display.

5. The method of claim 1, further comprising the acceptance of input to the computer system that causes the computer system to stop continued scrolling of the text.

6. The method of claim 1, further comprising the acceptance of input to the computer system that causes the computer system to scroll the text backwards.

7. The method of claim 1, wherein the location at which text is being read is specified using a cursor-control device.

8. The method of claim 7, wherein the cursor is not presented on a display device.

9. The method of claim 1, wherein the location at which text is being read is determined using information about eye movements of a user.

10. The method of claim 1, further comprising the step of delineating at least one region of the display graphically.

11. The method of claim 10, further comprising the step of using a cursor control device to specify the limits and shape of at least one region of the display.

12. The method of claim 1, wherein at least one region of the display is differentiated from at least one other region of the display by differing attributes of characters displayed within at least two display regions.

13. The method of claim 1, wherein at least one region of the display is differentiated from at least one other region of the display by differing attributes of the display background within said display regions.

14. The method of claim 1, wherein said text is read aloud.

15. The method of claim 14, wherein the location at which text is being read is determined by use of software that recognizes human speech.

16. The method of claim 14, wherein the computer system determines the location at which text is being read aloud by comparing what is said with what is written in the electronic text.

17. The method of claim 1, wherein the text is supplied over a network.

18. The method of claim 1, wherein information about the location at which text is being read is provided over a network.

19. A computer memory storage device encoded with a computer program for using a computer system to display electronic text comprising:
   a) means for presenting text to be read on a computer display comprising a first region and a second region, wherein:
      i) said first and second regions are non-overlapping; and
      ii) said second region is associated with display of text that is intended to be read after the text displayed in said first region;
   b) means for determining the location on the computer display at which text is being read by the reader; and
   c) means for adjusting the rate of text presentation such that:
      i) when said location on the computer display at which text is being read by the reader is within said first region of the display, the rate of text presentation does not change substantially over time;
      ii) when said location on the computer display at which text is being read by the reader is within said second region of the display, the rate of text presentation increases; and
      iii) after text has been read at said second location on the computer display and said rate of text presentation has increased, when the location on the computer display at which text is being read by the reader is returned to said first region of the display, the rate of text presentation does not change substantially from said increased rate.

20. A computer system for displaying electronic text comprising:
   a) a display device controlled by the computer, said display device imaging a portion of said text controlled by the computer system;
   b) means for presenting text to be read on a computer display comprising a first region and a second region, wherein:
      i) said first and second regions are non-overlapping; and
      ii) said second region is associated with display of text that is intended to be read after the text displayed in said first region;
   c) means for determining the location on the computer display at which text is being read by the reader; and
   d) means for adjusting the rate of text presentation such that:
      i) when said location on the computer display at which text is being read by the reader is within said first region of the display, the rate of text presentation does not change substantially over time;
      ii) when said location on the computer display at which text is being read by the reader is within said second region of the display, the rate of text presentation increases; and
      iii) after text has been read at said second location on the computer display and said rate of text presentation has increased, when the location on the computer display at which text is being read by the reader is returned to said first region of the display, the rate of text presentation does not change substantially from said increased rate.

* * * * *